(12) United States Patent
Glime, III et al.

(10) Patent No.: US 10,619,744 B2
(45) Date of Patent: Apr. 14, 2020

(54) VALVE WITH SELF-ALIGNING STEM TIP

(71) Applicant: Swagelok Company, Solon, OH (US)

(72) Inventors: William H. Glime, III, Chagrin Falls, OH (US); Branden W. Keeper, Mentor, OH (US)

(73) Assignee: SWAGELOK COMPANY, Solon, OH (US)

( * ) Notice: Subject to any disclaimer, the term of this patent is extended or adjusted under 35 U.S.C. 154(b) by 125 days.

(21) Appl. No.: 15/603,530

(22) Filed: May 24, 2017

(65) Prior Publication Data

US 2017/0343115 A1 Nov. 30, 2017

Related U.S. Application Data

(60) Provisional application No. 62/341,160, filed on May 25, 2016.

(51) Int. Cl.
| | |
|---|---|
| *F16K 1/36* | (2006.01) |
| *F16K 1/12* | (2006.01) |
| *F16K 25/00* | (2006.01) |
| *F16K 1/48* | (2006.01) |
| *F16K 31/12* | (2006.01) |

(52) U.S. Cl.
CPC ............ *F16K 1/36* (2013.01); *F16K 1/12* (2013.01); *F16K 1/48* (2013.01); *F16K 25/00* (2013.01); *F16K 25/005* (2013.01); *F16K 31/12* (2013.01)

(58) Field of Classification Search
None
See application file for complete search history.

(56) References Cited

U.S. PATENT DOCUMENTS

| | | | | |
|---|---|---|---|---|
| 2,479,688 A | * | 8/1949 | Lindgren | ............... F16K 1/36 251/86 |
| 3,241,805 A | | 3/1966 | Schumann | |

(Continued)

FOREIGN PATENT DOCUMENTS

| | | |
|---|---|---|
| DE | 29809605 | 10/1998 |
| EP | 1336059 | 4/2006 |

(Continued)

OTHER PUBLICATIONS

WO 9215809A1, EPO Translation, Jan. 11, 2019 (Year: 2019).*
International Search Report and Written Opinion from PCT/US2017/034119 dated May 25, 2016.

*Primary Examiner* — Jessica Cahill
*Assistant Examiner* — Daphne M Barry
(74) *Attorney, Agent, or Firm* — Calfee, Halter & Griswold LLP

(57) ABSTRACT

A valve includes a valve body with an annular valve seat having a first central axis, and a valve closure subassembly assembled with the valve body and including an axially movable valve stem and a stem tip attached to the valve stem by a stem connector and including an annular seal portion having a second central axis. When the first central axis is misaligned with the second central axis, the stem tip is pivotable about the valve stem to effect angular adjustment of the annular seal portion of the stem tip into uniform sealing engagement with the annular valve seat when a closing force is applied to the valve stem. The stem connector is configured to resist pivoting movement of the stem tip when the valve stem is in the open position.

23 Claims, 9 Drawing Sheets

(56) References Cited

U.S. PATENT DOCUMENTS

| | | | | |
|---|---|---|---|---|
| 3,552,714 A | * | 1/1971 | Manville | F16K 1/36 137/559 |
| 4,338,966 A | | 7/1982 | Smith | |
| 4,408,745 A | | 10/1983 | Swiers et al. | |
| 4,519,422 A | | 5/1985 | Cohen | |
| 4,634,099 A | | 1/1987 | Danko et al. | |
| 4,742,845 A | * | 5/1988 | Capoccia | F02M 69/54 137/510 |
| 4,923,173 A | * | 5/1990 | Szymaszek | F16K 1/36 251/333 |
| 4,995,589 A | | 2/1991 | Adishian et al. | |
| 5,709,369 A | * | 1/1998 | Hawkins | F16K 1/36 251/86 |
| 5,738,333 A | | 4/1998 | Cognevich et al. | |
| 6,125,809 A | | 10/2000 | Boast | |
| 6,685,165 B1 | | 2/2004 | Kloehn et al. | |
| 8,371,554 B1 | | 2/2013 | Beswick et al. | |
| 8,869,827 B2 | | 10/2014 | Yamauchi | |
| 9,200,716 B2 | | 12/2015 | Mevius et al. | |
| 10,120,395 B2 | * | 11/2018 | Ishida | F16K 1/36 |
| 2002/0074043 A1 | | 6/2002 | Beyer | |
| 2005/0145812 A1 | | 7/2005 | Kumar | |
| 2006/0237064 A1 | * | 10/2006 | Benson | F16K 1/36 137/487.5 |
| 2009/0078900 A1 | * | 3/2009 | Smith | F16K 1/36 251/129.15 |
| 2010/0155079 A1 | | 6/2010 | Stokka et al. | |
| 2011/0162737 A1 | | 7/2011 | Yamauchi | |
| 2012/0132839 A1 | | 5/2012 | Moren | |
| 2013/0092860 A1 | * | 4/2013 | Kiku | F16K 1/36 251/314 |
| 2015/0060708 A1 | | 3/2015 | Glime, III | |

FOREIGN PATENT DOCUMENTS

| | | | |
|---|---|---|---|
| GB | 457441 | 11/1936 | |
| GB | 933758 | 8/1963 | |
| GB | 1148094 | 4/1969 | |
| GB | 1231763 A2 * | 5/1971 | F16K 1/36 |
| WO | WO-9215809 A1 * | 9/1992 | F16K 51/02 |
| WO | 2015/052863 | 4/2015 | |

\* cited by examiner

VALVE WITH SELF-ALIGNING STEM TIP

CROSS-REFERENCE TO RELATED APPLICATION

This application claims priority to and all benefit of U.S. Provisional Patent Application Ser. No. 62/341,160, filed on May 25, 2016, for VALVE WITH SELF-ALIGNING STEM TIP, the entire disclosure of which is fully incorporated herein by reference.

BACKGROUND OF THE DISCLOSURE

The inventions relate to flow valves. The inventions more particularly relate to valves that utilize stem sealing subassemblies, including, for example, bellows valves.

SUMMARY OF THE DISCLOSURE

An exemplary aspect of the present application relates to a valve closure subassembly having a stem tip that is angularly adjustable with respect to the valve stem to accommodate misalignment of an annular sealing portion of the stem tip with an annular valve seat against which the stem tip seals.

In an exemplary embodiment, a valve includes a valve body and a valve closure subassembly assembled with the valve body. The valve body includes a central passage, an annular valve seat having a first central axis extending along the central passage, a first end passage that extends from the central passage to a first fluid port, and a second end passage that extends from the central passage to a second fluid port. The valve closure subassembly includes a valve stem extending along the first central axis and a stem tip attached to the valve stem by a stem connector and including an annular seal portion having a second central axis. The valve stem is axially movable from an open position permitting fluid flow between the first fluid port and the second fluid port to a closed position in which an annular seal portion of the stem tip engages the annular valve seat when a closing force is applied to the valve stem. When the first central axis is misaligned with the second central axis, the stem tip is pivotable about the valve stem to effect angular adjustment of the annular seal portion of the stem tip into uniform sealing engagement with the annular valve seat when the closing force is applied to the valve stem. The stem connector is configured to resist pivoting movement of the stem tip when the valve stem is in the open position.

In another exemplary embodiment, a valve closure subassembly includes a valve stem extending along a first central axis and a stem tip attached to the valve stem by a stem connector and including an annular seal portion having a second central axis. The stem tip is pivotable about the valve stem to effect angular adjustment of the second central axis with respect to the first central axis. The stem connector is configured to resist pivoting movement of the stem tip when a lesser pivoting torque (i.e., less than a closing force applied to the stem tip, for example, up to about 1 in-lb, up to about 5 in-lbs, or up to about 10 in-lbs) is applied to the stem tip.

In another exemplary embodiment, a valve closure subassembly includes a support ring for attachment to a valve body, a valve stem extending through a central passage of the support ring along a first central axis, a stem tip attached to the valve stem, and a hollow extensible member having a first end directly attached to the stem tip and a second end directly attached to the support ring. The valve stem is axially movable with respect to the support ring. The stem tip includes an annular seal portion having a second central axis, wherein the stem tip is pivotable about the valve stem to effect angular adjustment of the second central axis with respect to the first central axis.

In another exemplary embodiment, a valve closure subassembly includes a stem tip including a socket and an annular seal portion, a valve stem including a ball joint received in the socket for pivoting movement of the stem tip about the valve stem, and a retainer assembled with the stem tip and including a flexible ball retaining portion that engages the valve stem to resist pivoting movement of the stem tip.

These and other inventive concepts and embodiments are fully described hereinbelow, and will be readily understood by those skilled in the art from the following detailed description of the exemplary embodiments in view of the accompanying drawings.

DESCRIPTION OF THE EXEMPLARY EMBODIMENTS

The exemplary embodiments described herein are directed to a bellows valve, and to a bellows valve in combination with an actuator assembly, however, many different valve designs and configurations may be used as appropriate for particular applications, including, for example, other valves having stem sealing arrangements. Use of the terms axial and radial are referenced to a longitudinal axis, such as for example, a central axis as noted on the drawings. As described herein, the longitudinal axis may be the central longitudinal axis of the valve seat, the valve stem, or the sealing portion of the stem tip.

Valves utilizing stem sealing arrangements commonly include a flow path defining valve body having a central passage surrounded by an annular valve seat, and a valve stem disposed in the central passage and axially movable to engage an annular sealing portion of the valve stem (typically but not necessarily on an endmost stem tip) with the annular valve seat in a closed position. Angular or central axis misalignment of the valve stem sealing portion with respect to the annular valve seat may result in non-uniform or partial engagement, leakage, increased closing force required to effect a seal, and undesired wear and/or seal surface particle generation.

An inventive concept presented herein provides a valve design that accounts for or accommodates an axial or angular misalignment between an annular sealing portion of a stem tip of a stem sealing valve subassembly (e.g., a bellows valve subassembly) and an annular valve seat of a flow path defining valve body with which the stem closure subassembly is assembled. In one such embodiment, a valve closure subassembly includes a valve stem and a stem tip attached to the valve stem by a stem connector that permits or provides for pivoting or swiveling movement of the stem tip with respect to the valve stem, while axially fixing the stem tip on the valve stem (i.e., holding the stem tip axially rigid).

Figure 1:
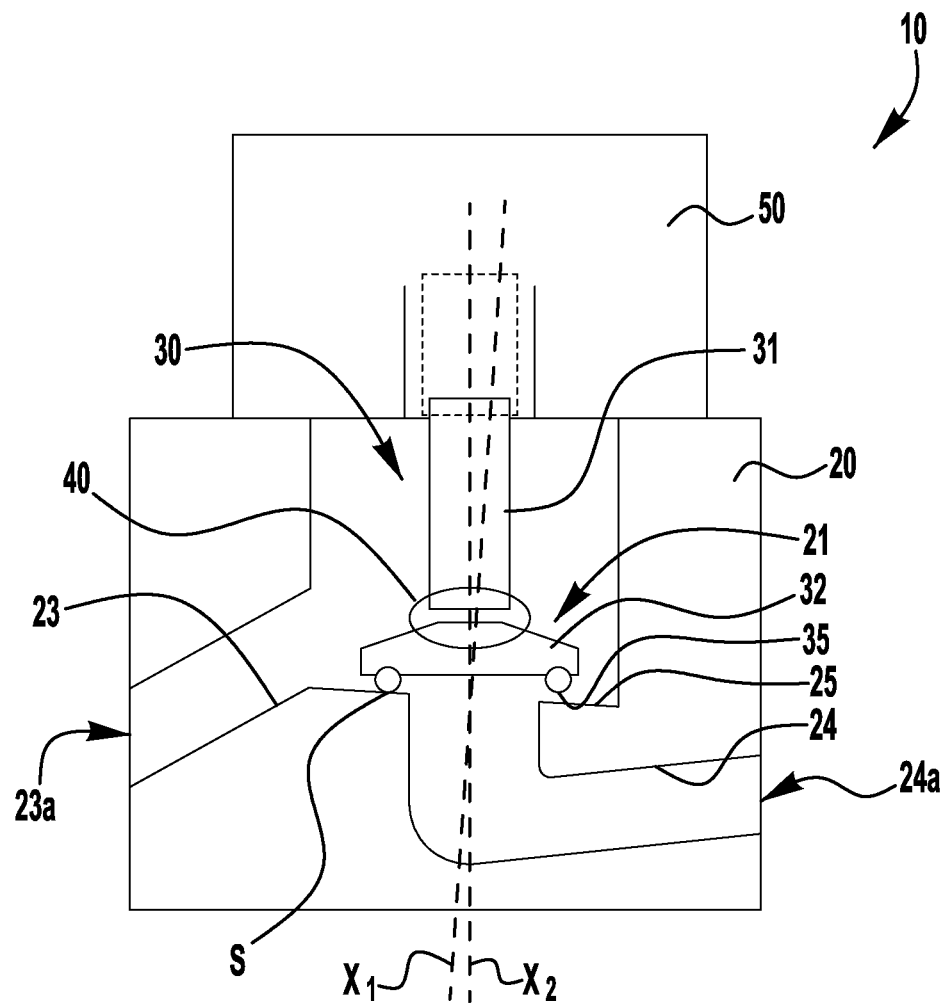
FIG. 1 is a schematic cross sectional view of a valve assembly in accordance with an exemplary embodiment, shown with the stem tip sealing portion misaligned with the valve seat.
Figure 2:
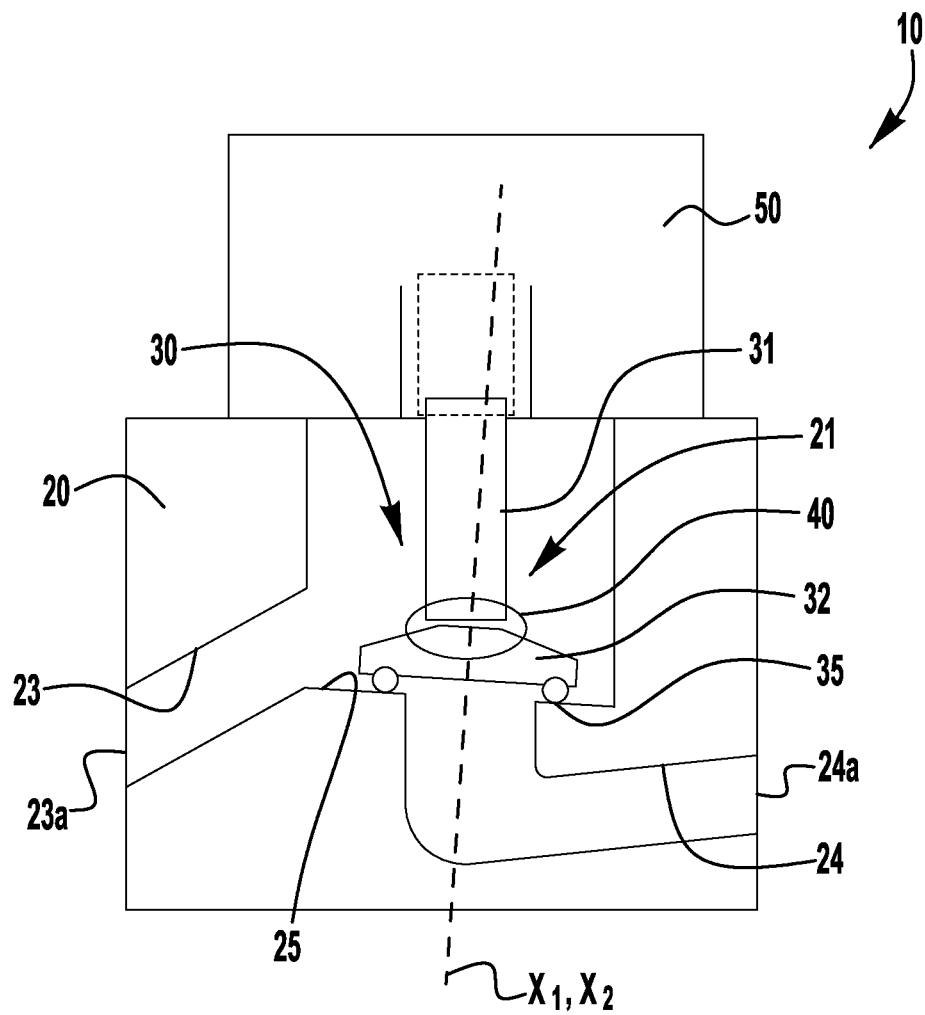
FIG. 2 is a schematic cross-sectional view of the valve assembly of FIG. 1, shown in the closed position with the stem tip adjusted for uniform sealing engagement between the stem tip sealing portion and the valve seat.
Figure 3:
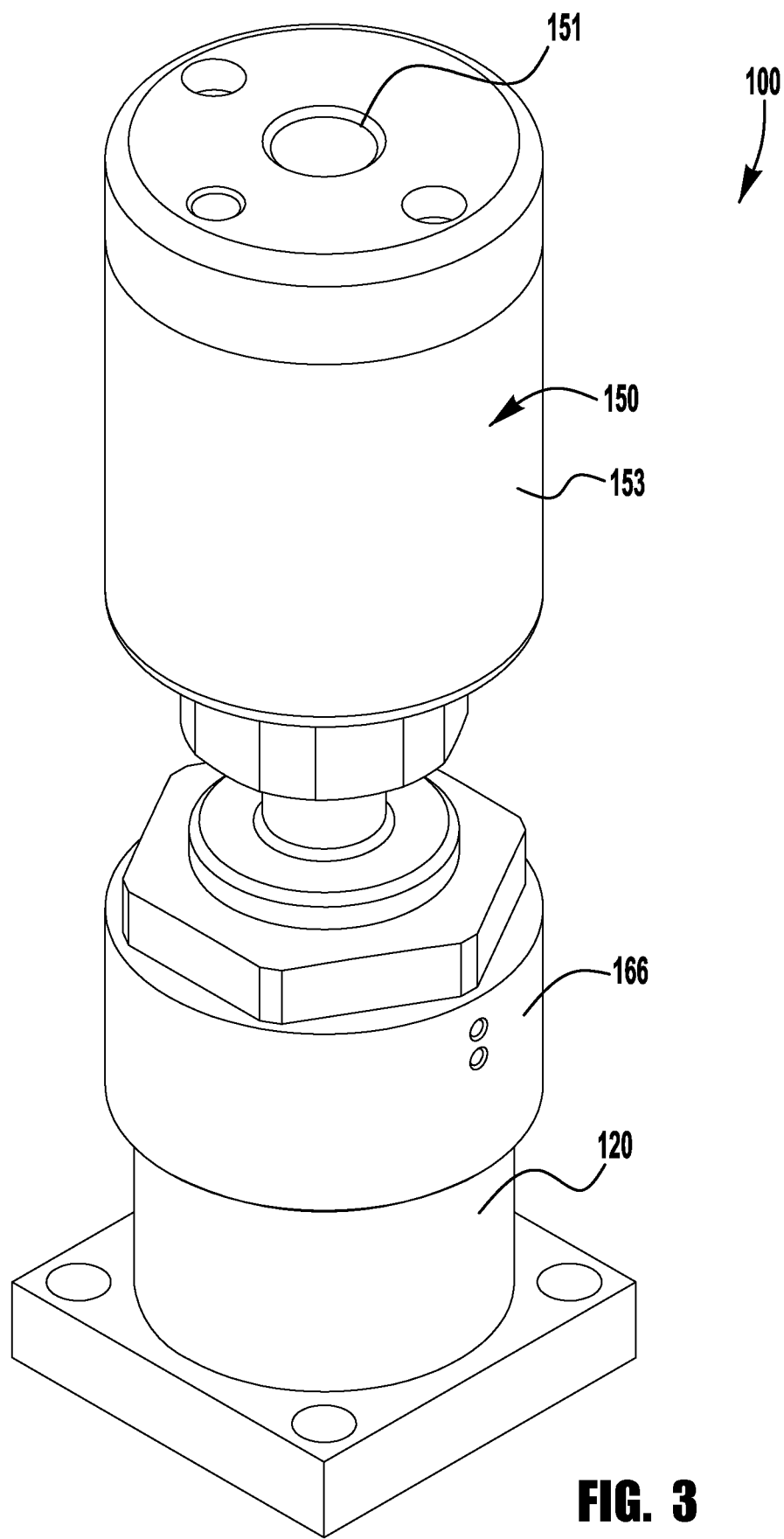
FIG. 3 is a perspective view of a valve assembly in accordance with another exemplary embodiment.

FIGS. 1 and 2 schematically illustrate a valve 10 having a valve body 20 assembled with a valve closure subassembly 30. The valve body 20 includes a central passage 21 and an annular valve seat 25 surrounding the central passage and having a central axis $X_1$ that extends along the central passage. A first end passage 23 extends from the central passage 21 to a first fluid port 23a (e.g., a conduit fitting connection), and a second end passage 24 extends from the central passage to a second fluid port 24a.

The valve closure subassembly 30 includes a valve stem 31 disposed in the central passage 21, extending along the central axis $X_1$, and a stem tip 32 attached to an end portion 31a of the valve stem 31 by a stem connector, shown schematically at 40. An actuator 50 is assembled with the valve body 20 and is operable to axially move the valve stem 31 between an open position, in which the stem tip is spaced apart from the valve seat 25 to permit fluid flow between the first and second fluid ports 23a, 24a, and a closed position, in which an annular sealing portion 35 of the stem tip 32 seals against the valve seat 25 to block flow between the first and second fluid ports 23a, 24a.

While the exemplary stem tip 32 is preferably axially fixed with respect to the valve stem 31, to accommodate misalignment of the valve stem 31 with respect to the central axis $X_1$ of the valve seat 25 (e.g., due to orientation of the valve stem or variances in the valve seat surface), the exemplary stem connector 40 is movable or adjustable to permit pivoting or swiveling movement of the stem tip 32 with respect to the valve stem 31. This pivoting or swiveling movement provides for reorientation or adjustment of the misaligned stem tip 32 during valve closure, such that a central axis $X_2$ of the sealing portion 35 is aligned with or substantially coaxial with the central axis $X_1$ of the valve seat 25 when the valve stem 31 is in the closed position. The stem connector 40 may be integral with or assembled with either or both of the valve stem 31 and the stem tip 32, and may take a variety of forms, including, for example, a joint or a deformable connection, as discussed in greater detail below.

When a closing force is applied to the misaligned valve stem 31 by the actuator 50, initial non-uniform engagement between the sealing portion 35 and the valve seat 25 on one side (at S in FIG. 1) applies a pivoting force or torque to this side portion S of the stem tip 32, thereby pivoting the stem tip and bringing the sealing portion central axis $X_2$ into alignment with the valve seat central axis $X_1$ for uniform sealing engagement between the sealing portion 35 and the valve seat 25 (FIG. 2).

While a stem tip may be permitted to freely swivel on a valve stem, such an arrangement may result in subsequent misalignment of the stem tip when the valve is opened (e.g., due to fluid forces against the stem tip, or forces applied by other valve components, such as a bellows), thereby requiring repeated re-alignment of the stem tip upon each valve closure and undesirable repetitive movement. According to another inventive aspect of the present application, the stem connector 40 attaching the stem tip 32 to the valve stem 31 may be configured to resist further pivoting movement of the stem tip as a result of lesser torque forces applied to the stem tip, as may be experienced when the valve stem is in the open position. In such an arrangement, pivoting adjustment of the stem tip may be limited to valve closure when there is seat-seal misalignment, for example, upon initial closure of the valve, or subsequent to valve component wear or other conditions that may result in seat-seal misalignment during the life of the valve.

Accordingly, the stem connector 40 may be configured to resist pivoting adjustment of the stem tip 32 when the stem tip is exposed to lesser (e.g., open valve) torque forces, while permitting pivoting adjustment of the misaligned stem tip when the stem tip is exposed to relatively greater normal closing forces, as applied by the actuator 50. In other exemplary embodiments, the stem connector may be configured to resist pivoting adjustment when the stem tip is exposed to normal valve closing forces, instead requiring an increased closing force to be applied to a valve stem with a misaligned stem tip to effect an angular adjustment. In some such embodiment, this increased closing force may be applied only during initial valve assembly, or by a non-standard (e.g., use of increased pneumatic pressure to an actuator port) operation of the valve actuator.

Many different configurations may be utilized to provide a resistance to movement or adjustment of the stem connector that is sufficient to prevent pivoting or swiveling movement of the stem tip when the valve is in the open condition, while still permitting pivoting movement of the stem tip into seat-seal alignment upon valve closure. As one example, a joint connector between the valve stem and stem tip may be provided with a press fit, friction fit, clamping engagement, or spring biased retention to resist pivoting movement due to lesser torque forces (e.g., torque forces up to about 1 in-lb, or up to about 5 in-lbs, or up to about 10 in-lbs).

With reference to FIGS. 3-7, an exemplary embodiment of a valve assembly 100 includes a valve body 120, a valve closure subassembly 130 at least partially disposed in central passage 121 of the valve body, and a valve actuator 150 assembled with the valve body and operable to move the valve closure subassembly 130 between open and closed positions to open and close the valve 100. In the illustrated embodiment, the valve actuator 150 is a pneumatic actuator, operated by applying a pressurized gas to an actuation port 151 of the actuator. Alternatively, the actuator may be a manual actuator, for example with a lever or knob, or an electromagnetic actuator or a hydraulic actuator or any other type of actuator that produces a linear or axial motion to open and close the valve 100.

The valve body 120 includes an annular valve seat 125 surrounding the central passage 121 and having a central axis $X_1$ that extends along the central passage. A first end passage 123 extends from the central passage 121 to a first fluid port 123a (e.g., a conduit fitting connection), and a second end passage 124 extends from the central passage to a second fluid port 124a. As shown, the first and second fluid ports 123a, 124a may be disposed on a common lower surface of the valve body 120. As such, this configuration is what is generally and commonly known as a surface mount configuration. However, other porting configurations may be used, for example as schematically shown in the first embodiment herein. Mounting bolts (not shown) may be used to attach a surface mount fluid component to an underlying substrate or manifold (not shown) as is known.

The valve closure subassembly 130 includes a valve stem 131 disposed in the central passage 121, extending along the central axis $X_1$, and a stem tip 132 attached to an end portion 131a (FIGS. 5 and 6) of the valve stem 131 by a stem connector 140. The stem tip 132 includes an annular sealing portion 135 disposed on an end surface of the stem tip for engagement with the annular valve seat 125. As shown, the sealing portion 135 may include a sealing insert staked or otherwise retained in a groove in the stem tip 132, and may be provided in a material selected to effectively seal against the annular valve seat 125, such as, for example, perfluoroalkoxy (PFA) polymer, polytetrafluoroehtylene (PTFE), polyetheretherketone (PEEK), metals (e.g., 316 stainless steel), ceramics, (e.g., aluminum oxide, sapphire, ruby, or alumina). The annular valve seat 125 may, but need not, form a substantially planar surface perpendicular to the central axis $X_1$ of the valve seat. In other embodiments (not shown), the annular valve seat may include an insert staked or otherwise retained in a groove in the valve body, and the stem tip sealing portion may, but need not, form a substantially planar surface perpendicular to the central axis of the annular sealing portion. In still other embodiments (not shown), the valve seat and stem tip sealing portion may include complementary shaped frustoconical surfaces.

As used herein, a stem connector may include a variety of configurations and arrangements. In one embodiment, a stem connector includes a pivotable or swiveling joint connection between the valve stem and stem tip. As one example, a stem connector may include a ball joint disposed on one of the valve stem and the stem tip, and a socket disposed on the other of the valve stem and the stem tip. In the illustrated embodiment of FIGS. 3-7, the valve stem 131 includes a ball joint 141 and the stem tip 132 includes a socket 142 that receives the ball joint 141 for pivoting or swiveling movement of the stem tip 132 on the ball joint. As used herein, a "ball" or "ball joint" need not be a spherical component, and may include other shapes and contours selected to permit pivoting or swiveling movement within a socket.

The ball and socket joint may be configured to axially fix the stem tip on the valve stem. Additionally or alternatively, the ball and socket joint may provide resistance to movement or adjustment of the socket 142 on the ball joint 141 that is sufficient to prevent pivoting or swiveling movement of the stem tip 132 when the valve 100 is in the open condition, while still permitting pivoting movement of a misaligned stem tip 132 into seat-seal alignment upon valve closure. As one example, the ball joint 141 and socket 142 may be provided with a press fit or friction fit, such that the contacting surfaces of the ball joint and socket provide resistance to pivoting or swiveling movement of the stem tip when the stem tip is exposed to the lesser torque forces that may be experienced when the valve is in the open condition (e.g., pressurized fluid flow, biasing force from the bellows). This friction may be increased or enhanced, for example, by use of compressible materials (e.g., polymers, metallic foams) or high friction surfaces. For example, the outer surface of the ball joint and/or the inner surface of the socket may be knurled or splined to increase frictional resistance to pivoting movement. As another example, a compressible coating or bushing between the ball joint and socket may provide an increased grip and resulting resistance to pivoting movement. In such examples, the friction or gripping engagement may be selected to prevent pivoting movement when exposed to lesser (open valve) torque forces (e.g., torque forces up to 1 in-lb, up to 5 in-lbs, or up to 10 in-lbs), while permitting pivoting movement when exposed to greater (valve closing) torque forces (e.g., torque forces greater than 1 in-lb, greater than 5 in-lbs, or greater than 10 in-lbs).

According to another aspect of the present application, resistance to pivoting or swiveling movement of a valve stem tip may be increased or controlled by a retainer or retaining member assembled with one of the valve stem and the stem tip for biasing engagement of the pivoting joint (e.g., engagement of the ball joint in a ball and socket joint). As one example, a retaining ring may be secured or assembled with or adjacent to a socket portion of a ball and socket joint, such that a base portion of the ball joint extends through an aperture in the retaining ring. An inner periphery (e.g., a web, tab, flange, etc.) of the retaining ring engages the ball joint. The inner periphery of the retaining ring is configured to be rigid enough to resist or prevent pivoting or swiveling movement of the ball joint in the socket when the stem tip is exposed to lesser, open valve forces, but flexible enough to permit pivoting or swiveling adjustment of a misaligned stem tip during valve closure.

In the illustrated embodiment, the stem tip 132 includes a recessed shoulder portion or counterbore 144 outward of and surrounding the socket 142, and a retaining ring 145 press fit into the counterbore 144. An inner periphery or web portion 146 of the retaining ring 145 engages a base portion 141a (e.g., a spherical surface or cylindrical neck extending from the ball) of the ball joint 141 to resist pivoting or swiveling movement of the ball joint 141 in the socket 142. The resistance provided by the retaining ring 145 may be controlled or selected based on the material of the ring (e.g., flexibility or elasticity), the thickness of the web portion 146, or the amount of surface contact between the web portion and the ball joint base portion (e.g., uniform circumferential engagement, or intermittent/discrete engagement, such as by spaced tabs). As the retaining ring 145 provides for retention of the ball joint 141 in the socket 142 and for resistance to pivoting movement, the ball joint 141 may be loosely received in the socket 142. In other embodiments, the ball joint may be retained in the socket with a press fit or friction fit, to provide further resistance to pivoting beyond that provided by the retainer.

Figure 5:
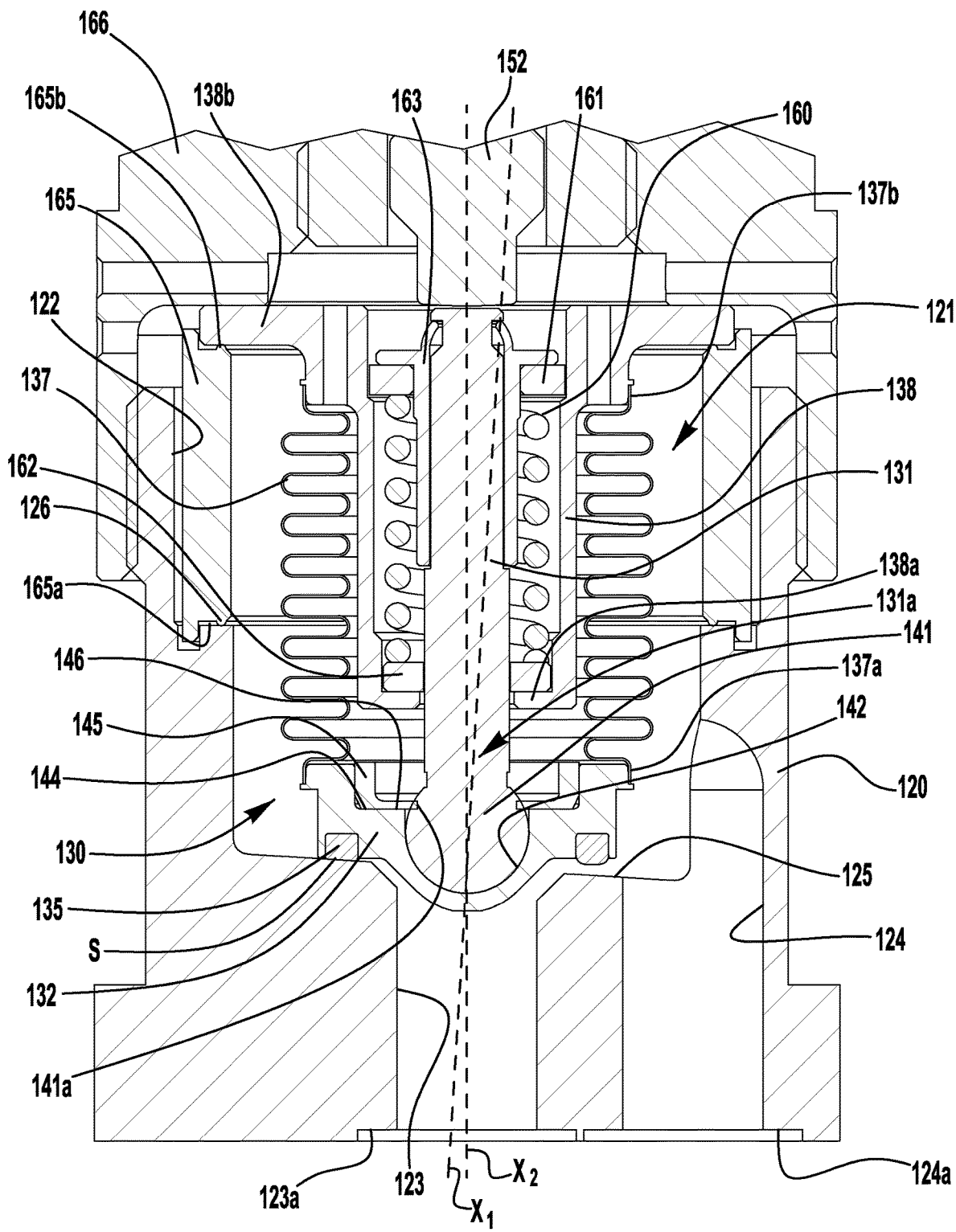
FIG. 5 is an enlarged partial cross-sectional side view of the valve assembly of FIG. 3, shown with the stem tip sealing portion misaligned with the valve seat.

When a closing force is applied by the actuator 150 to a valve stem 131 having a stem tip 132 that is misaligned with respect to the valve seat 125, as shown (and exaggerated for clarity) in FIG. 5, initial non-uniform engagement between the sealing portion 135 and the valve seat 125 on one side (at S in FIG. 5) applies a pivoting force or torque to this side S of the stem tip 132, thereby pivoting the ball joint 141 within the socket 142 (and against the retaining ring 145), to bring the sealing portion central axis $X_2$ into alignment with the valve seat central axis $X_1$ for uniform sealing engagement between the sealing portion 135 and the valve seat 125 (FIG. 2). When the valve is subsequently opened, the biasing engagement of the retaining ring web portion 146 against the base portion 141a of the ball joint 141 prevents further pivoting movement of the stem tip 132 on the valve stem 131 when the stem tip is exposed to lesser torque forces (e.g., pressurized system fluid, biasing force of the attached bellows).

In the exemplary embodiment illustrated herein, the valve closure subassembly 130 includes a hollow extensible member (e.g., a bellows 137, as shown) surrounding the valve stem 131 and having a first end 137a attached (e.g., welded or otherwise sealingly attached) to the stem tip 132 and a second end 137b attached to the valve body 120. While the bellows 137 may be directly attached to the valve body, in the illustrated embodiment, the second end 137b of the bellows is directly attached (e.g., welded or otherwise sealingly attached) to a support ring 138 assembled with the valve body 120, as discussed in greater detail below. The bellows 137 extends and contracts axially as the valve stem 131 is moved between the open and closed positions (i.e., in response to operation of the actuator 150), to maintain a fluid tight seal enclosure around the valve stem, thereby maintaining the valve stem and the stem-actuator connection as non-wetted components. The terms "hollow extensible member" and "bellows," as used herein, are intended to be construed broadly, and to include a conventional or traditional bellows design or alternative bellows designs, for example a series of conical elements or springs or other elements that form a hollow extensible member. Bellows valves find particular use for high purity, high flow rate applications, but the inventions may additionally or alternatively be used in valves for many other types of applications, including, for example, valves having wetted valve stems (i.e., without a bellows or other sealing enclosure surrounding the stem).

According to another aspect of the present application, the pivoting resistance function of the stem connector may additionally or alternatively be provided by the bellows connection between the valve stem and the stem tip. In one such embodiment, at least a portion of the bellows may be plastically deformable, such that when a closing force is applied to the misaligned valve stem, initial non-uniform engagement between the sealing portion and the valve seat on one side applies a pivoting force or torque sufficient to plastically deform the plastically deformable portion of the bellows, thereby pivoting the ball joint within the socket for uniform sealing engagement between the sealing portion and the valve seat. The plastically deformed portion of the bellows may be rigid enough to resist further plastic deformation when exposed to lesser torque forces (e.g., the open valve forces described above).

Figure 8:
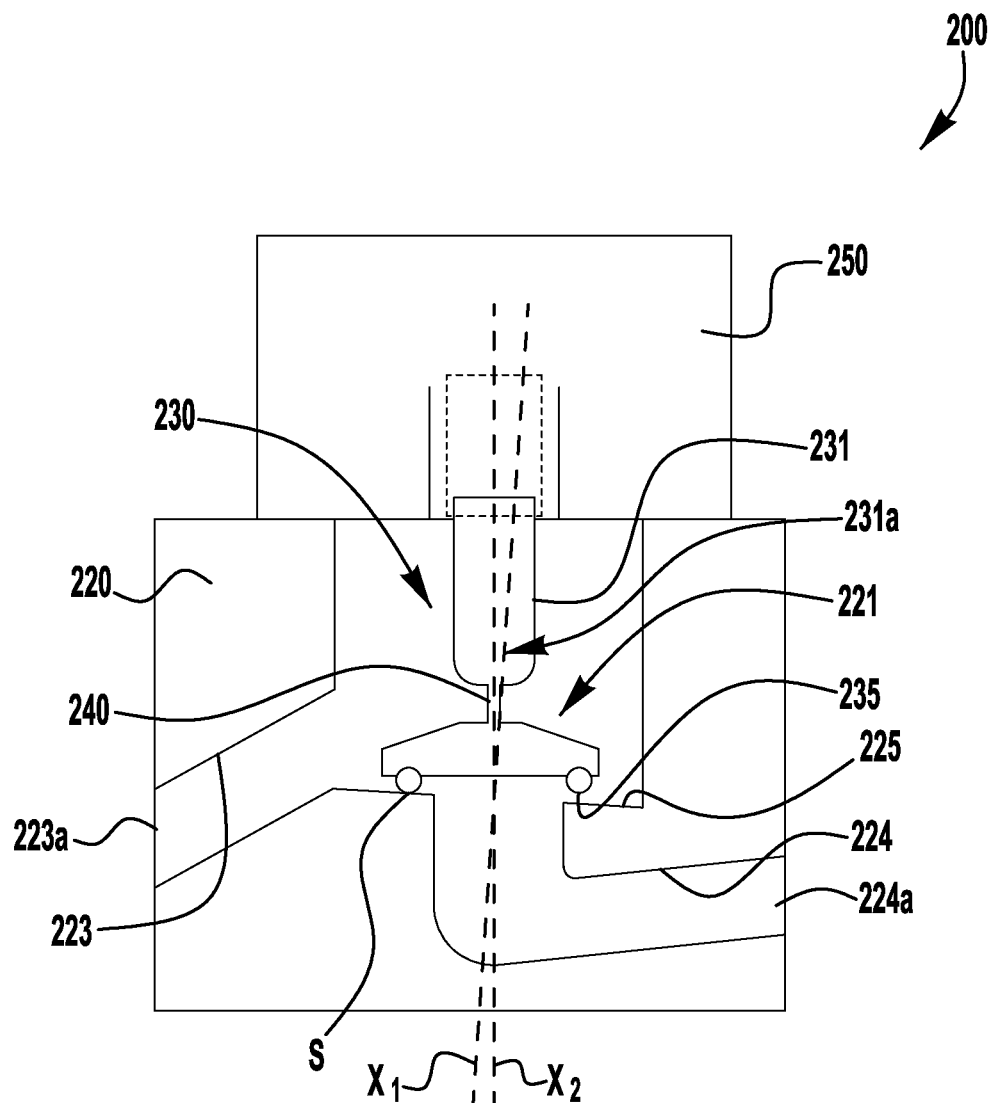
FIG. 8 is a schematic cross sectional view of a valve assembly in accordance with another exemplary embodiment, shown with the stem tip sealing portion misaligned with the valve seat.
Figure 9:
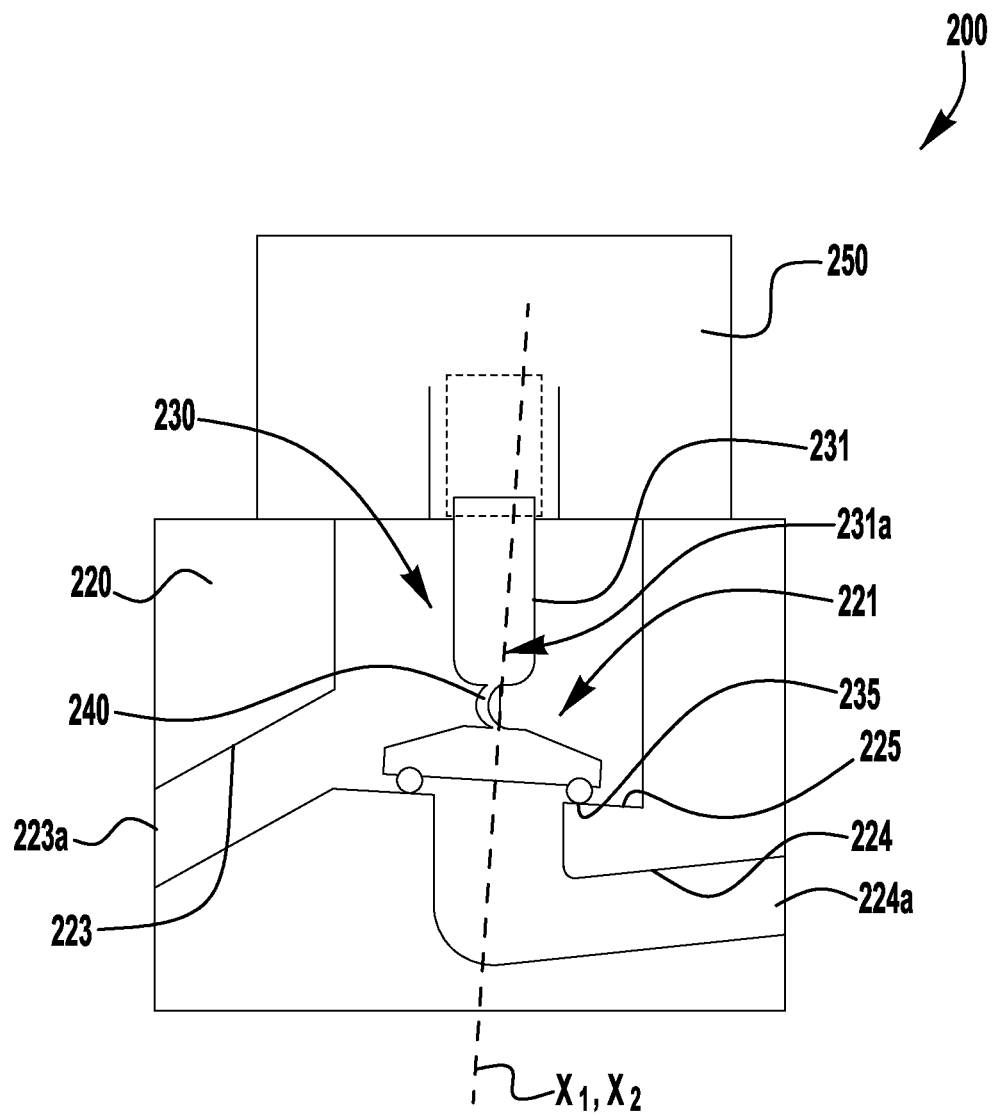
FIG. 9 is a schematic cross-sectional view of the valve assembly of FIG. 8, shown in the closed position with the stem tip adjusted for uniform sealing engagement between the stem tip sealing portion and the valve seat.

Still other plastically deformable components or configurations may provide resistant pivoting of the stem tip on the valve stem. In one such embodiment, as schematically shown in FIGS. 8 and 9, a valve 200 includes a valve body 220 assembled with a valve closure subassembly 230 having a valve stem 231 and a stem tip 232 attached to an end portion 231a of the valve stem 231 by a plastically deformable stem connector 240. An actuator 250 is assembled with the valve body 220 and is operable to axially move the valve stem 231 between an open position, in which the stem tip is spaced apart from the valve seat 225 and a closed position, in which an annular sealing portion 235 of the stem tip 232 seals against the valve seat 225. To accommodate misalignment of the valve stem 231 with respect to the central axis $X_1$ of the valve seat 225, the stem connector 240 is a plastically deformable shaft configured to bend to provide for pivoting or swiveling movement of the stem tip 232 with respect to the valve stem 231, to orient the stem tip 232 such that a central axis $X_2$ of the sealing portion 235 is aligned with or substantially coaxial with the central axis $X_1$ of the valve seat 225 when the valve stem 231 is in the closed position. The shaft 240 may be integral with the valve stem 231 and the stem tip 232, as shown, or may be otherwise attached to the valve stem and stem tip.

When a closing force is applied to the misaligned valve stem 231 by the actuator 250, initial non-uniform engagement between the sealing portion 235 and the valve seat 225 on one side (at S in FIG. 8) applies a pivoting force or torque to this side portion S of the stem tip 232, thereby bending the shaft 240 to pivot the stem tip and bring the sealing portion central axis $X_2$ into alignment with the valve seat central axis $X_1$ for uniform sealing engagement between the sealing portion 235 and the valve seat 225 (FIG. 9).

Referring back to the embodiment of FIGS. 3-7, the bellows 137 may also sealingly enclose a biasing member 160, for example, a spring. The biasing member 160 may be captured between a spring guide or upper bushing 161 and a lower bushing 162, and held in compression by a threaded member 163 that may be screwed onto an upper end of the valve stem 131. The lower bushing 162 is supported by a radially inward flange 138a on the support ring 138. The compressed biasing member 160 applies an upward force on the valve stem 131 so that the valve 100 in this embodiment is a normally open valve (disregarding for the moment operation of the actuator 150). Many other designs may be used to provide the normally open functionality, and alternatively the valve 100 may be designed as a normally closed valve. The biasing member 160 also causes the bellows 137 to compress longitudinally when the valve stem 131 is moved upward (as viewed in FIG. 4.)

The valve body 120 may be machined or otherwise formed with a valve cavity wall 122 (valve cavity 122 for short herein), a portion of which may be cylindrical or may be generally cylindrical in shape, although alternatively other geometries may be used as needed. The valve closure subassembly 130 is at least partially received in the valve cavity 122. An adapter 165 is partially disposed within the valve cavity 122. The adapter 165 may be shaped generally as a cylinder to be received in the valve cavity 122. Alternative geometry shapes may be used, it being preferred for convenience but not required that the adapter 165 generally conform to the shape of the valve cavity 122 (herein the adapter 165 may also be referred to as a cylinder adapter 165 for embodiments having generally cylindrical shapes for the adapter 165 and the valve cavity portion that receives the adapter). The adapter 165 thus has a smaller outside diameter than the diameter of the valve cavity 122 and a larger inside diameter than the outside diameter of the bellows 137.

A bonnet nut 166 may be joined with the valve body 120 using a threaded connection or other suitable means. The adapter 165 is captured and compressively axially loaded between an upper flange 138b of the support ring 138 and a support surface 126 of the valve body 120 when the bonnet nut 166 is tightened down. A fluid tight body seal is made between a lower surface 165a of the cylinder adapter 165 and the support surface 126, and a fluid tight subassembly seal is made between an upper surface 165b of the cylinder adapter 165 and the upper flange 138b of the support ring 138. To facilitate the subassembly seal and the body seal, the adapter 165 may include on the upper surface 165b an upper annular bead that forms a compression face seal with the upper flange 138b, and the adapter 165 may include on the lower surface 165a a lower annular bead that forms a compression face seal with the support surface 126. Therefore, after the bonnet nut 166 is tightened down onto the valve body 120, the adapter 165 in combination with the valve body 120 and the support ring 138 subdivides or partitions the valve cavity 122 to provide a sealed fluid flow cavity (when the valve 100 is installed or plumbed with inlet and outlet fittings or connections attached.) The sealed fluid flow cavity provides a fluid tight flow path between the first flow passageway 123 and the second flow passageway 124 when the valve 100 is in an open position and a sealed flow cavity when the valve 100 is in a closed position.

The adapter 165 in effect allows for the valve body 120 to be machined with a larger valve cavity 122 than could otherwise be provided if the adapter 165 were not used. As noted above, by larger valve cavity is meant that dimensionally either the diameter of the valve cavity can be made larger for machining the flow passageways or a shallower or shorter longitudinal length, or both if so desired. In the embodiment of FIGS. 3-7, the adapter 165 allows for a larger inside diameter of the valve cavity 122 to facilitate machining. In the second embodiment described below, an adapter may be used that provides for an axially or longitudinally shorter valve body to facilitate machining.

Figure 4:
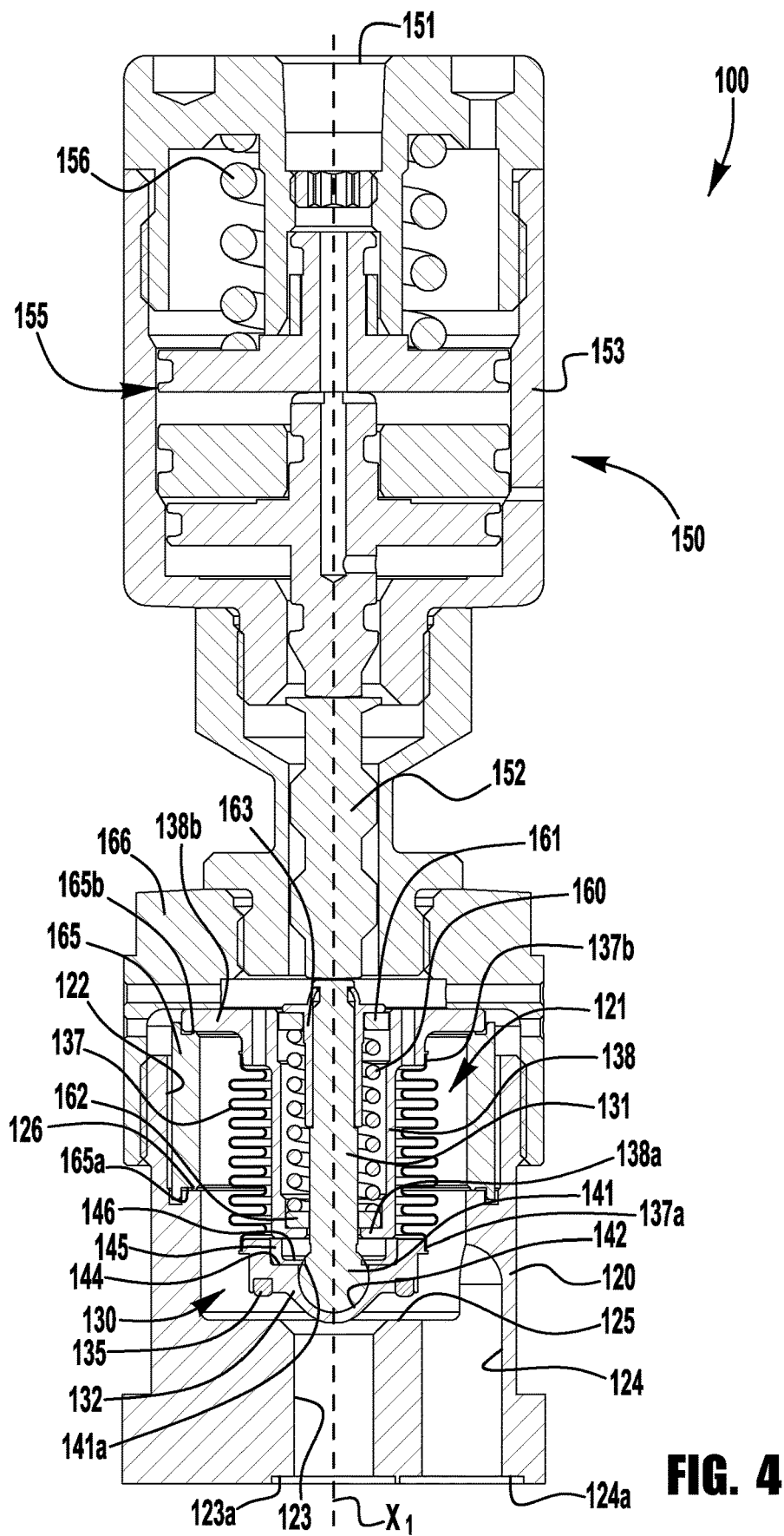
FIG. 4 is a cross-sectional side view of the valve assembly of FIG. 3, shown in the open condition.
Figure 6:
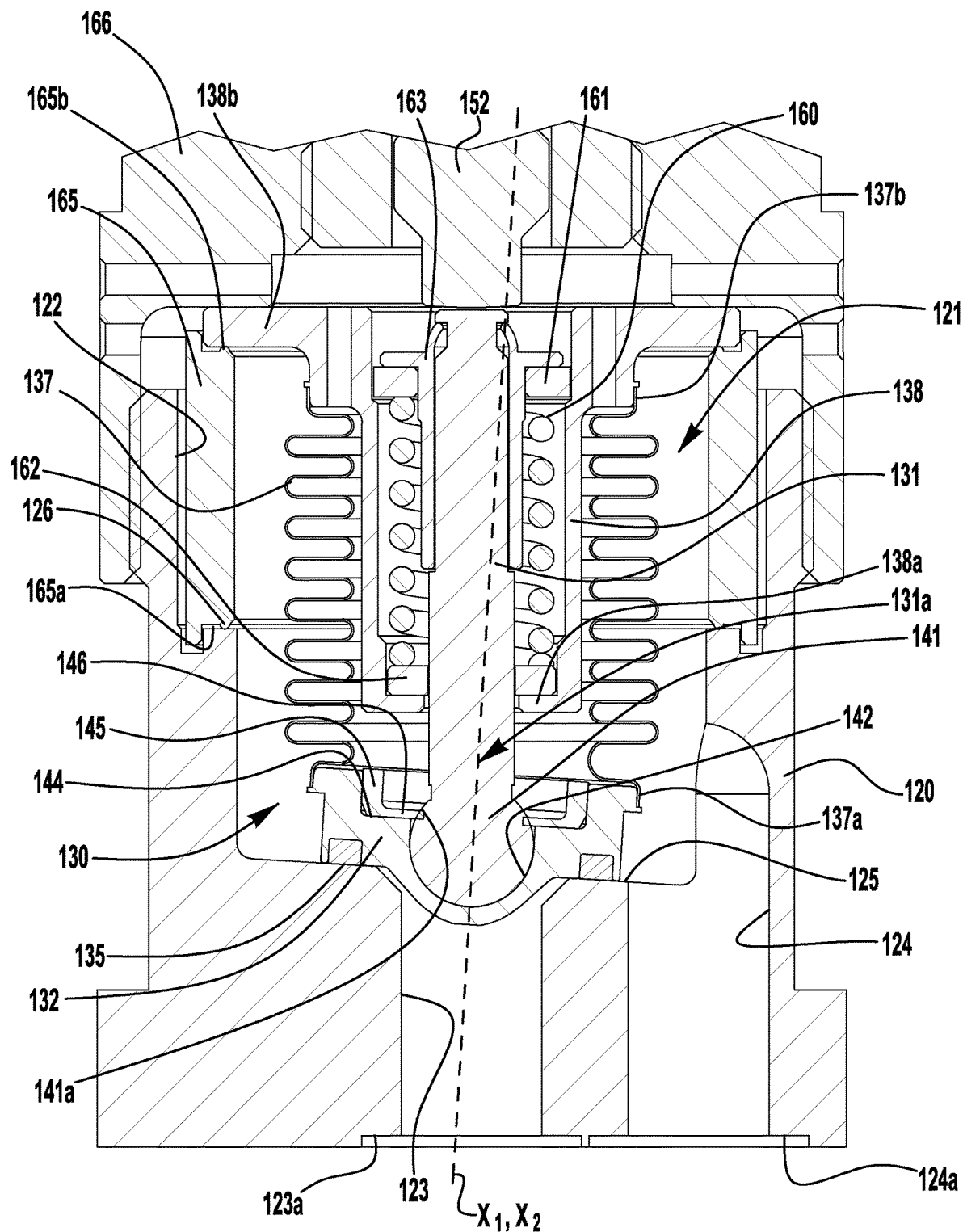
FIG. 6 is an enlarged partial cross-sectional side view of the valve assembly of FIG. 3, shown in the closed position with the stem tip adjusted for uniform sealing engagement between the stem tip sealing portion and the valve seat.
Figure 7:
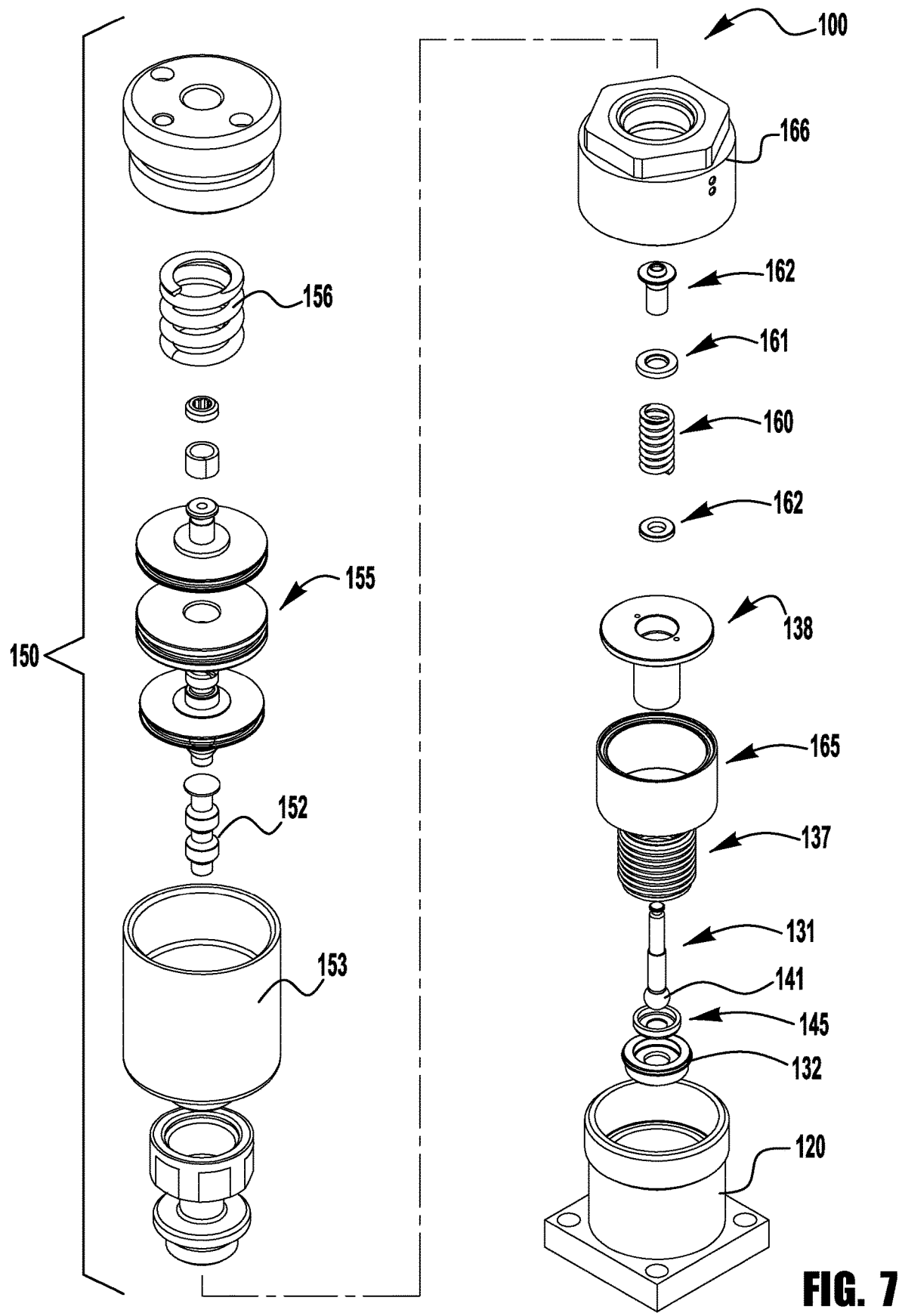
FIG. 7 is an exploded perspective view of the valve assembly of FIG. 3.

The lower bushing 162 serves to help center the valve closure element or valve stem 131. The valve stem 131 may for example be a floating valve stem as depicted in FIGS. 4-6, meaning that the valve stem 131 is not tied or mechanically connected to the actuator 150. Rather, the valve stem 131 upper end simply contacts a drive member 152 of the actuator 150. The lower bushing 162 helps maintain alignment and self-centering of the valve stem 131 so as to form an effective closing seal when the valve 100 is in the closed position.

The pneumatically operated actuator assembly 150 (FIG. 4) may include a piston assembly 155 that is disposed in an actuator housing 153. The actuator 150 may be mounted to the valve 100 by a threaded connection with the bonnet nut 166. As shown, the actuator housing 153 may be a multi-piece housing or alternatively a single piece housing. In the exemplary embodiment, two pistons may be used but alternatively a single piston actuator may be used or more than two pistons may be used as needed. A spring 156 biases the piston assembly 155 downward against the force of the biasing member 160. The piston assembly 155 optionally may drive a drive member 152, for example in the form of an actuator stem 152 that contacts an upper end of the valve closure subassembly 130, for example, an upper surface of the threaded member 163. The spring 156 may be stronger than the biasing member 160 so that with no air pressure applied to the actuator 150, the valve 100 is in a closed position and the bellows 137 is longitudinally extended. When pressurized air is supplied to the pneumatically operated actuator assembly 150, the air pressure moves the piston assembly 155 against the force of the spring 156, thereby allowing the biasing member 160 to longitudinally compress the bellows 137 to lift the valve stem 131, thereby opening the valve 100. Alternatively, the actuator 150 may be configured so that application of pressurized air to the piston assembly 155 closes the valve 100 to provide a normally open valve. The same functionalities may alternatively be achieved with manual actuators or other actuator designs.

Note that an additional benefit of the adapter concept is that the adapter in effect decouples the valve body from the bellows. In other words, the bellows and the adapter preferably are not welded to each other nor to the valve body. The use of a compression seal or other mechanical seal means (mechanical as distinguished from a welded connection) between the adapter and the valve body as well as between the adapter and the valve member subassembly allows for easy installation of the valve member subassembly into the valve body, and also the adapter and the valve member subassembly to be removed easily and replaced if so needed for maintenance or repair. Alternatively, the adapter may be welded at one end to the valve member subassembly to form a single piece component and then installed with a single compression seal for the body seal. In either scenario, different adapters having different dimensions such as diameter or longitudinal length may be used to accommodate different bellows designs while still fitting into a particular or common valve body. This means that a single valve body size may be used with different bellows sizes by use with an appropriately sized adapter. Moreover, a particular bellows design may be used in differently sized valve bodies by providing different adapters as needed.

The inventive aspects and concepts have been described with reference to the exemplary embodiments. Modification and alterations will occur to others upon a reading and understanding of this specification. It is intended to include all such modifications and alterations insofar as they come within the scope of the appended claims or the equivalents thereof.

What is claimed is:

1. A valve, comprising:
   a valve body including a central passage, an annular valve seat surrounding the central passage and having a first central axis, a first end passage that extends from the central passage to a first fluid port, and a second end passage that extends from the central passage to a second fluid port; and
   a valve closure subassembly assembled with the valve body and including a valve stem extending along the first central axis and a stem tip assembled with the valve stem by a stem connector and including an annular seal portion having a second central axis, the valve stem being axially movable from an open position permitting fluid flow between the first fluid port and the second fluid port to a closed position in which an annular seal portion of the stem tip engages the annular valve seat when a closing force is applied to the valve stem;
   wherein when the first central axis is misaligned with the second central axis, the stem tip is pivotable about the valve stem to effect angular adjustment of the annular seal portion of the stem tip into uniform sealing engagement with the annular valve seat when the closing force is applied to the valve stem; and
   wherein the stem connector comprises a socket disposed on the stem tip, a ball joint disposed on the valve stem and received in the socket for pivoting movement of the stem tip about the valve stem, and an annular retaining ring assembled with the stem tip in a counterbore surrounding the socket and including a flexible ball retaining inner peripheral web portion that contacts a spherical surface of the ball joint to resist pivoting movement of the stem tip when the valve stem is in the open position.

2. The valve of claim 1, wherein when the valve stem is in the closed position, the annular seal portion engages the annular valve seat along a surface that is perpendicular to the first central axis.

3. The valve of claim 1, wherein the annular valve seat defines a planar surface that is perpendicular to the first central axis.

4. The valve of claim 1, wherein the ball joint is press fit against the socket to resist pivoting movement of the stem tip.

5. The valve of claim 1, wherein at least one of the ball joint and the socket is knurled to resist pivoting movement of the stem tip.

6. The valve of claim 1, wherein the valve closure subassembly comprises a spring biasing member that biases the valve stem toward the open position.

7. The valve of claim 1, wherein the annular seal portion of the stem tip comprises an annular seal insert retained in a groove in the stem tip.

8. The valve of claim 1, wherein the valve closure subassembly further comprises a hollow extensible member having a first end attached to the stem tip and a second end attached to the valve body.

9. The valve of claim 8, wherein the hollow extensible member comprises a bellows.

10. The valve of claim 8, wherein the hollow extensible member sealingly encloses the valve stem within the valve body.

11. The valve of claim 8, wherein the second end of the hollow extensible member is directly attached to a support ring assembled with the valve body.

12. The valve of claim 1, further comprising a valve actuator assembled with the valve closure subassembly and operable to apply the closing force to the valve stem.

13. The valve of claim 12, wherein the closing force is a first closing force, wherein the valve actuator is further operable to apply a second closing force to the valve stem, the second closing force being smaller than the first closing force, wherein the second closing force is sufficient to move the annular sealing portion into sealing engagement with the annular valve seat when the first central axis is aligned with the second central axis, and wherein the second closing force is insufficient to effect angular adjustment of the annular seal portion of the stem tip into uniform sealing engagement with the annular valve seat when the first central axis is misaligned with the second central axis.

14. The valve of claim 1, wherein the stem connector is configured to resist pivoting movement of the stem tip when a pivoting torque of up to 1 in-lb is applied to the stem tip.

15. The valve of claim 1, wherein the stem tip is axially fixed with respect to the valve stem.

16. A valve closure subassembly comprising:
a stem tip including a socket and an annular seal portion;
a valve stem including a ball joint received in the socket for pivoting movement of the stem tip about the valve stem; and
an annular retaining ring assembled with the stem tip in a counterbore surrounding the socket and including a flexible ball retaining inner peripheral web portion that contacts a spherical surface of the ball joint to resist pivoting movement of the stem tip.

17. The valve closure subassembly of claim 16, further comprising a support ring for attachment to a valve body, the support ring defining a central passage, and a hollow extensible member having a first end directly attached to the stem tip and a second end directly attached to the support ring.

18. The valve closure subassembly of claim 16, wherein the hollow extensible member comprises a bellows.

19. The valve closure subassembly of claim 16, wherein the annular valve seat defines a planar surface that is perpendicular to the first central axis.

20. The valve closure subassembly of claim 16, wherein at least one of the ball joint and the socket is knurled to resist pivoting movement of the stem tip.

21. The valve closure subassembly of claim 16, wherein the annular seal portion of the stem tip comprises an annular seal insert retained in a groove in the stem tip.

22. The valve closure subassembly of claim 16, wherein the stem connector is configured to resist pivoting movement of the stem tip when a pivoting torque of up to 1 in-lb is applied to the stem tip.

23. The valve closure subassembly of claim 16, wherein the stem tip is axially fixed with respect to the valve stem.

* * * * *